United States Patent
Simon et al.

(10) Patent No.: US 8,450,451 B2
(45) Date of Patent: May 28, 2013

(54) EPOXY RESIN CURING AGENT FOR ENHANCED WEAR RESISTANCE AND WEATHERABILITY OF CURED MATERIALS

(75) Inventors: Christian Simon, Oslo (NO); Ferdinand Männle, Oslo (NO); Jest Beylich, Oslo (NO); Rune H. Gaarder, Fjellhamar (NO); Kjell Windsland, Oslo (NO); Keith Redford, Hagan (NO)

(73) Assignee: SINTEF, Trondheim (NO)

( * ) Notice: Subject to any disclaimer, the term of this patent is extended or adjusted under 35 U.S.C. 154(b) by 1143 days.

(21) Appl. No.: 10/531,473

(22) PCT Filed: Oct. 16, 2003

(86) PCT No.: PCT/NO03/00342
§ 371 (c)(1), (2), (4) Date: Aug. 3, 2005

(87) PCT Pub. No.: WO2004/035675
PCT Pub. Date: Apr. 29, 2004

(65) Prior Publication Data
US 2005/0288395 A1    Dec. 29, 2005

(30) Foreign Application Priority Data
Oct. 16, 2002  (NO) .................................. 20024990

(51) Int. Cl.
*C08G 59/50* (2006.01)
*C01B 33/141* (2006.01)
*C08L 63/00* (2006.01)

(52) U.S. Cl.
USPC ............................ 528/421; 516/111; 523/400

(58) Field of Classification Search
None
See application file for complete search history.

(56) References Cited

U.S. PATENT DOCUMENTS

| | | | |
|---|---|---|---|
| 5,496,402 A * | 3/1996 | Sakamoto et al. | 106/287.16 |
| 5,786,032 A | 7/1998 | Hughes | |
| 6,033,749 A * | 3/2000 | Hata et al. | 428/36.7 |
| 2002/0018900 A1 * | 2/2002 | Kron et al. | 428/447 |
| 2007/0260030 A1 * | 11/2007 | Mannle et al. | 528/32 |
| 2007/0290176 A1 * | 12/2007 | Mannle et al. | 252/601 |
| 2008/0039607 A1 * | 2/2008 | Mannle et al. | 528/5 |

FOREIGN PATENT DOCUMENTS

| | | |
|---|---|---|
| DE | 10117338 A1 * | 10/2002 |
| JP | 54041938 | 4/1979 |
| JP | 62089902 | 4/1987 |
| JP | 1313518 | 12/1989 |
| JP | 5331417 | 12/1993 |
| JP | 7171493 | 7/1995 |
| JP | 10120972 | 5/1998 |

OTHER PUBLICATIONS

Machine translation of DE 10117338 A1, provided by the EPO website (no date).*
Feher et al. "Synthesis of highly functionalized cube-octameric polyhedral oligosilsesquioxanes (R8Si8O12)"; J. Chem. Soc., Dalton Trans., pp. 1491-1497 (Jan. 1999).*
Li et al. "Polyhedral Oligomeric Silsesquioxane (POSS) Polymers and Copolymers: A Review"; J. Inorganic and Organometallic Polymers, vol. 11, No. 3, pp. 123-154 (Sep. 2001).*

* cited by examiner

*Primary Examiner* — Michael J Feely
(74) *Attorney, Agent, or Firm* — Ladas & Parry LLP

(57) ABSTRACT

Hardener for curing of epoxy resins which produces materials with high abrasion resistance, photostability and chemical resistance, comprising a sol prepared by controlled hydrolysis and condensation of compounds of the type: $(X—B—)_n Si(—Y)_{4-n}$ where n=1 or 2, X=SH, —N=C=O, or $NR_1R_2$, $R_1, R_2$ being chosen from hydrogen, saturated or unsaturated $C_1$-$C_{18}$-alkyl, substituted or non-substituted aryl, formyl, aliphatic or aromatic carbonyl, carbamoyl, sulphonyl, sulphoxyl, phosphonyl, sulphinyl, phosphinyl, while the carbon chains of said compounds may include one or more of the elements oxygen, nitrogen, sulphur, phosphorus, silicon and boron, and/or may include one or more hydrolysable silane units, or $R_1, R_2$ are chosen from condensation products or addition products of one or more types or chemical compounds such as acids, alcohols, phenols, amines, aldehydes or epoxides; B is a spacing group chosen from saturated or unsaturated $C_1$-$C_{18}$-alkylene, substituted or nonsubstituted arylene, while the carbon chains of the stated compounds may optionally include one or more of the elements oxygen, nitrogen, sulphur, phosphorus, silicon and boron; and Y is chosen from hydrolisable groups such as alkoxy, carboxyl, and halogen.

13 Claims, No Drawings

EPOXY RESIN CURING AGENT FOR ENHANCED WEAR RESISTANCE AND WEATHERABILITY OF CURED MATERIALS

This application is a 371 of PCT/NO2003/000342 filed on Oct. 16, 2003.

The invention concerns a hardener for epoxy resins which produce materials with very high colour stability, abrasion, scratch and chemical resistance. The invention also pertains a method for curing an epoxy resin utilizing such a hardener as well as a cured epoxy material manufactured in this manner.

BACKGROUND

Commercially available epoxy resins in combination with commercially available hardeners produce materials with a broad application as coatings for corrosion protection, components of composite materials and as moulding plastics. In addition to the basic components of epoxy resin and hardener the starting materials may contain dyes, pigments, fillers, reactive and non-reactive diluents, volatile solvents, stabilizing agents and additives.

Epoxy resins usually contain more than one 1,2-epoxy group per mole and may be based on saturated, unsaturated, aromatic, aliphatic, cycloaliphatic or heterocyclic structures.

Hardeners are usually chosen from the following groups of chemical compounds: aromatic, aliphatic, cycloaliphatic or heterocyclic amines, amine adducts, polyamides, polyamido amides, Mannich bases, ketimines or carboxylic acid derivatives. Mercaptan compounds can also be used as active compounds within the hardener.

Fillers include titanium dioxide, silica, diverse silicates, minerals or carbon black Stabilisers include antioxidants, radical scavengers or UV-absorbers.

Additives include plasticizers, catalysts for the curing reaction, rheology modifying additives or surfactants.

Reactive diluents are often epoxy compounds of considerably lower viscosity than the epoxy resins.

It is known that the colour stability of materials which are made from commercially available epoxy resins and hardeners is often poor because the hardeners or combination of hardener, resin and additives, have a strong tendency to yellowing, also after curing. A known method of reducing yellowing is to use amine based hardeners with aliphatic or cycloaliphatic structures, because in the presence of light the yellowing of cycloaliphatic amines is significantly less than that of aromatic amines.

The disadvantage of using aliphatic or cycloaliphatic amines as hardeners or curing agents is that the abrasion and scratch resistance of the resulting materials is often poorer than for aromatic amines.

It is also known that the abrasion, scratch and chemical resistance of cured epoxies can be significantly improved by the use of fillers such as silica (U.S. Pat. No. 3,794,609). The disadvantage however is that the transparency of the hardened epoxy is considerably reduced, which is perceived as detrimental, particularly when the material is intended for use as coating.

A known method of producing cured epoxies with high colour stability, abrasion, scratch and chemical resistance, and acceptable transparency can therefore be to use hardeners based on aliphatic or cycloaliphatic amines with low yellowing tendency together with silica based nanoparticles as an additive. One example of silica based nanoparticles is the Aerosil® products of Degussa AG, Germany. From EP 0774443 A1 it is known that nanodisperse titanium dioxide is suitable for improving the colour stability of, amongst others, polymer based formulations.

An alternative method for the preparation of coatings with good abrasion, scratch and chemical resistance together with acceptable transparency is based on organic, polymer forming components and inorganic, particle containing or particle forming components where the particle size is between 1 and 150 nm. The coating is usually cured by applying the mixture of organic and inorganic components to a surface and drying with the aid of heat and/or UV-VIS radiation. Such coating forming mixtures may contain epoxy resins or compounds with epoxy groups. A large number of patents and publications exist which describe the preparation of such organic-inorganic hybrid materials and possible applications: JP 09132637, U.S. Pat. Nos. 5,618,860, 5,804,616, WO 9832792 EP 496552, KR 2000059589, JP 2001288401 and Milena Spirkova et. al. "Hybrid Organic-Inorganic Epoxide-Based Coatings Prepared by Sol-Gel Process", *Proceedings of 6th Nürnberg Congress on Creative Advances in Coatings Technology*", paper 12 (2001).

Thermosetting plastics such as epoxy resins can also be modified with nanodisperse inorganic particles for applications other than coatings. DE 198 60 691 A1 describes a magnetic paste which contains nanocrystals. WO 9631572 A1 describes polymerisable, nanoparticle containing formulations which, amongst others, are based on acrylic or epoxy resins and which can be used for building up or joining of optoelectronic elements. WO 0130304 A1 describes materials which are based on organic thermosets and inorganic nanoparticle containing or nanoparticle forming components. The materials are used as dental replacement materials. In addition a number of scientific publications describe the modification of thermosetting plastics such as epoxy resins with nanoparticle containing or nanoparticle forming mixtures (e.g. Soo-Jin Park et. al. "Surface Modification of Montmorillonite on Surface Acid-Base Characteristics of Clay and Thermal Stability of Epoxy/Clay Nanocomposites", *Journal of Colloid and Interface Science* 251, 160-165 (2002)).

Also the preparation of nitrogen containing, basic hardeners or curing agents with hydrolisable silane compounds for thermosets such as epoxy resins is known. U.S. Pat. No. 4,988,778 describes hardeners which are prepared by partial alcoholysis/aminolysis of γ-aminopropyltrimethoxy silane with diisopropyl amine, but without the addition of water. JP 04366159 describes a product which is made by the reaction of γ-glycidopropyltrimethoxy silane with water and small quantities of an amidine compound 1,8-diazabicyclo[5.4.0] undeken-7 and which is used as a subcomponent for curing of an epoxy containing thermosetting mixture. The basic amidine compound constitutes however less than 62 ppm by weight of the silane/water mixture thus the product itself must be considered as unsuitable as a hardener for epoxy resins.

It is also shown in PCT/NO2001/00287 that an existing organic lacquer or gelcoat can be modified with suitable nanoparticle mixtures to, amongst other things, give improved scratch resistance. Here a stable nanoparticle containing sol is prepared which is added to the existing organic lacquer or gelcoat as required.

However, we believe, that the use of sol-gel mixtures, which are prepared by controlled hydrolysis/condensation of γ-aminopropyltrialkoxy silane or other nitrogen containing silanes and/or mercaptosilanes as hardener for epoxy resins has not been documented.

The sol-gel process is a simple way of preparing nanoparticle based mixtures. The sol-gel process is based on a controlled hydrolysis/condensation of e.g. silane alkoxides. The process is described in PCT/NO2001/00287 and yields gels which relatively easily can be mixed into polymeric and/or polymerisable organic formulations.

One example is sols which are prepared by controlled hydrolysis/condensation of γ-aminopropyltrialkoxy silane. The sol-gel process is in this case particularly simple because an external catalyst is not required and because the process can be performed at room temperature or with gentle heating.

Known hardeners for epoxy resins are based on amines such as 4,4'-diaminodiphenylmethane (I) or meta-xylylene-diamine (II):

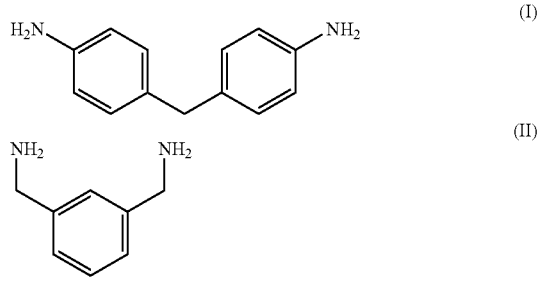

Amines react with epoxy resins by crosslinking with two or more polymer chains in the epoxy resins. This leads to solidification (hardening) of the two component system which consists of amine based hardener and epoxy resin and the formation of a relatively abrasion resistant material. The disadvantage of amine based hardeners is that the hardened material yellows relatively quickly due to, amongst other things, oxidative degradation of components in the amine based hardener.

In addition the abrasion/scratch resistance of the hardened material is often too poor for the material to be used for demanding applications.

OBJECTIVE

The object of the present invention is to provide a hardener for epoxy resins that provides cured epoxy materials with high abrasion resistance and photostability.

It is a further object to provide a hardener as mentioned above that provides materials with high transparency and clarity.

It is still further an object of the invention to provide such a hardener that is easy to manufacture in industrial scale, have a long shelf life and that is readily able to cure epoxy resins under normal conditions.

THE INVENTION

In a first aspect the invention relates to a hardener for epoxy resins defined by the features disclosed in the characterising part of claim 1.

According to a second aspect the invention relates to a cured epoxy resin as defined by claim 15.

According to a third aspect the invention concerns a method for curing epoxy resins as defined by claim 16.

Preferred embodiments of the invention are disclosed by the dependent claims.

The first aspect of the invention concerns sol-gel based hardeners which can be used for curing epoxy resins. In a first step a sol is prepared by controlled hydrolysis/condensation of suitable amine containing hydrolisable and condensable silane compounds. Suitable amine containing hydrolisable and condensable silane compounds are those comprised by the formula:

where n=1 or 2, X=SH, —N=C=O or $NR_1R_2$. $NR_1R_2$ is chosen among hydrogen, saturated or unsaturated $C_1$-$C_{18}$-alkyl, substituted or not substituted aryl, formyl, aliphatic or aromatic carbonyl, carbamoyl, sulfphonyl, sulphoxyl, phosphonyl, sulphinyl, phosphinyl, wherein the carbon chains in said compounds optionally may contain one or more the elements oxygen, nitrogen, sulphur, phosphorous, silicon, and boron, and/or optionally containing one or more hydrolysable silane units, or $R_1$, $R_2$ are chosen among condensation products or addition products of one or more types of chemical compounds such as acids, alchohols, phenols, amines, aldehydes or epoxides.

A simple way to prepare nanoparticle based compositions is the sol-gel process. The sol-gel process is based on controlled hydrolysis/condensation of e.g silane oxides. The process is described in PCT/NO2001/00287 and results in gels that are comparatively easily mixable with polymer containing or polymerizable organic formulations. One example is the preparation of sols by controlled hydrolysis/condensation of γ-aminopropyltrialkoxysilane. In this case the sol-gel process is particularly simple as no catalyst is required and the process may be conducted at ambient temperature or with only slight warning.

The main difference in this invention in relation to the inventions in the above mentioned patents and the results of the above mentioned publications is as follows: In the first step a stable sol is prepared by controlled hydrolysis/condensation of a suitable, possibly appropriately modified, silane compound. When stored under favourable conditions the product may be stable for six months or longer. In the second step the sol is mixed with suitable epoxy resins, to give cured materials with improved colour stability, abrasion, scratch and chemical resistance. As far as the inventors know, no prior art describes stable sols with long stability as hardeners for epoxy resins with two or more components.

Controlled hydrolysis/condensation of compounds as described in the characterisation part of patent claim 1 generally results in a sol where the particle forming or oligomeric condensate products have several more or less free amino groups on the surface. Thus these particles or oligomers can react with thermosets such as epoxy resins by crosslinking with two or more polymer chains in the thermoset, in the same way as the known amine based hardeners (I) and (II). A corresponding curing reaction is possible with sols prepared by controlled hydrolysis/condensation of other nitrogen containing silane compounds or mercaptosilanes, provided that the sol contains particles or oligomers with a sufficiently large number of more or less free amino groups and/or mercaptan groups. Generally the reaction products of the sol-gel process such as alcohol or excess water must be removed before the sol can be used as a hardener or as a component of a hardener for epoxy resins.

The crosslinking reaction and therefore the curing reaction between particle forming condensate products with more or less free amino groups on the surface and an epoxy can be described as in (IV):

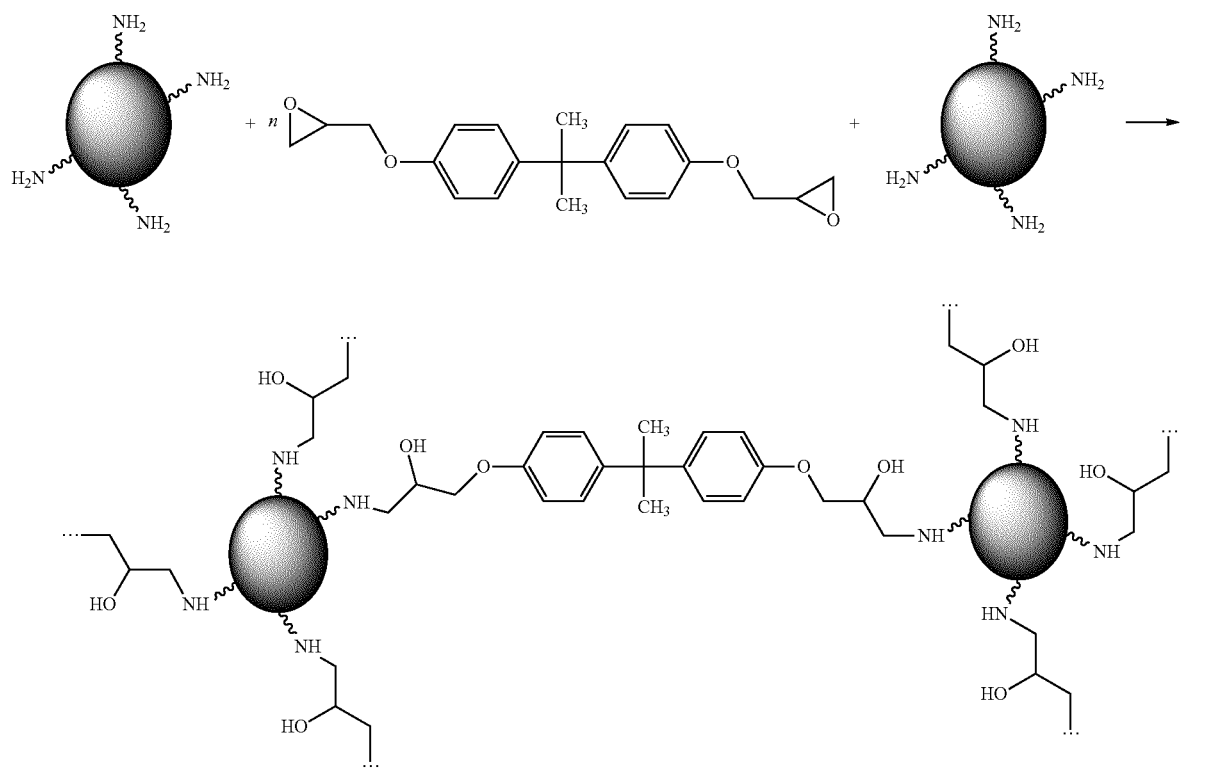

(IV)

Sometimes the stability of the sol can be too short, especially after the reaction products from the sol-gel process such as alcohols or excess water have been removed. Also the rate of the curing reaction between the sol and epoxy resin may be far from optimal such that the curing reaction may be too fast or too slow. Adjustment of the rate of the curing reaction is desirable in such cases. It may also be cases where that the compatibility and therefore the miscibility of the sol and the epoxy resin are not good enough, which may, e.g., result in inadequate material properties in the cured material. Also in such cases adjustment of compatibility is required. Modification of the prepared sol by an appropriate chemical conversion can therefore be advantageous.

Suitable chemical conversions to modify the prepared sol have the aim to modify more or less free amino groups at the surface of the particle forming condensate product. Such conversions are conducted between more or less free amino groups at the surface of a particle forming condensate product and reactive compounds that preferably reacts quantitatively with the more or less free amino groups at temperatures T<470 K and pressures P<0.3 MPa. Particularly suitable reactive compounds are epoxides, acid derivatives, blocked and unblocked isocyanates and compounds R—X comprised of a) A suitable atom or an atom group X and
b) a group R wherein R—X is able to react with more or less free amino groups in a substitution reaction by which an atom or atom group X is replaced by an amino group (Endre Berner, "Lærebok i organisk kjemi", Aschehoug & Co., Oslo (1964), p. 144-147) and where the group R is chosen from non-substituted saturated or unsaturated $C_1$-$C_{24}$ alkyl, substituted saturated or unsaturated $C_1$-$C_{24}$-alkyl, substituted or non-substituted aryl, aliphatic or aromatic carbonyl, wherein the carbon chains of said compounds may optionally include one or more of the elements oxygen, nitrogen, sulphur, silicon and boron, or groups chosen among condensation products or addition products of one or more types of chemical compounds such as acids, alcohols, phenols, amines, aldehydes or epoxides, and the atom or an atom group X preferably chosen among halogen, substituted or non-substituted alkoxyl, phenoxyl, amine, carboxylate, sulphonate, sulphinate, phosphonate or phosphinate.

Examples of suitable epoxides are monoglycidyl compounds that may be described as

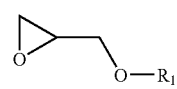

where $R_1$ is chosen among groups such as hydrogen, non-substituted saturated or unsaturated $C_1$-$C_{24}$ alkyl, substituted saturated or unsaturated $C_1$-$C_{24}$-alkyl, substituted or non-substituted aryl, aliphatic or aromatic carbonyl, wherein the carbon chains of said compounds may optionally include one or more of the elements oxygen, nitrogen, sulphur, silicon and boron, or R1 is chosen among condensation products or addition products of one or more types of chemical compounds such as acids, alcohols, phenols, amines, aldehyd s or epoxides.

Examples of suitable epoxides are furthermore compounds with epoxidized C=C double bonds that may be described as

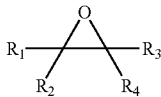

wherein $R_1$—$R_4$ are chosen among groups such as hydrogen, non-substituted saturated or unsaturated $C_1$-$C_{24}$ alkyl, substituted saturated or unsaturated $C_1$-$C_{24}$-alkyl, substituted or non-substituted aryl, aliphatic or aromatic carbonyl, wherein the carbon chains of said compounds may optionally include one or more of the elements oxygen, nitrogen, sulphur, silicon and boron, or R1 is chosen among condensation products or addition products of one or more types of chemical compounds such as acids, alcohols, phenols, amines, aldehydes or epoxides Examples of suitable acid derivatives are Derivatives of carboxyl acids

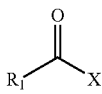

Derivatives of sulphonic acids

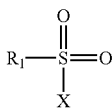

Derivatives of sulphonic acids

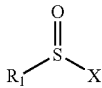

where $R_1$ is chosen among groups such as hydrogen, non-substituted saturated or unsaturated $C_1$-$C_{24}$ alkyl, substituted saturated or unsaturated $C_1$-$C_{24}$-alkyl, substituted or non-substituted aryl, aliphatic or aromatic carbonyl, wherein the carbon chains of said compounds may optionally include one or more of the elements oxygen, nitrogen, sulphur, silicon and boron, or R1 is chosen among condensation products or addition products of one or more types of chemical compounds such as acids, alcohols, phenols, amines, aldehydes or epoxides, and X is a suitable removable group such as halogen, substituted or non-substituted alkoxy, phenoxy, amine, carboxylate, sulphonate, sulphinate, phosphonate or phosphinate.

Examples of suitable isocyanates may be described as

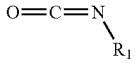

where $R_1$ is chosen among groups such as hydrogen, non-substituted saturated or unsaturated $C_1$-$C_{24}$ alkyl, substituted saturated or unsaturated $C_1$-$C_{24}$-alkyl, substituted or non-substituted aryl, aliphatic or aromatic carbonyl, wherein the carbon chains of said compounds may optionally include one or more of the elements oxygen, nitrogen, sulphur, silicon and boron, or $R_1$ is chosen among condensation products or addition products of one or more types of chemical compounds such as acids, alcohols, phenols, amines, aldehydes or epoxides, and wherein the isocyanate group may be blocked by means of known chemical substances.

In the crosslinking process and thus the curing process between particle forming condensation products and more or less free amino groups at the surface of epoxy resins, addition products of the following type are formed:

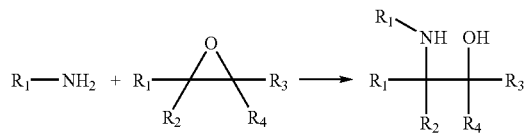

In the same manner addition products are formed when more or less free amino groups are converted with isocyanates:

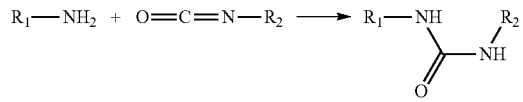

Thus, particle forming condensation products with more or less free amino groups at the surface may also be used in the crosslinking process and thus the curing process of isocyanate-based resins, which leads to the formation of so-called polyurethanes.

Preferred Embodiments

A preferred embodiment of the invention s a hardener as defined by (III) wherein X=$NR_1R_2$, $R_1$ is hydrogen and $R_2$ is H—(HN—$CH_2$—$CH_2$—)$_m$ where m=0-6, B is propylene, n=1, and Y is ethoxy or methoxy.

Another preferred embodiment of the invention is a hardener as defined by (III) wherein X=$NR_1$ $R_2$, $R_1$ is hydrogen and R2 is phenyl, B is propylene, n=1, and Y is ethoxy or methoxy.

Still another preferred embodiment of the invention is a hardener as defined by (III) wherein X=$NR_1R_2$, $R_1$ is hydrogen and R2 is carbamoyl, B is propylene, n=1, and Y is ethoxy or methoxy.

Still another preferred embodiment of the invention is a hardener as defined by (III) wherein X=SH, B is propylene, n=1, and Y is ethoxy or methoxy.

Still another preferred embodiment of the invention is a hardener as defined by (III) wherein X=N=C=O, B is propylene, n=1, and Y is ethoxy or methoxy.

Still another preferred embodiment of the invention is a hardener as defined by (III) wherein the sol entirely or partly is prepared by controlled hydrolysis and condensation of bis (γ-trialkoxysilylpropyl)amine.

Still another preferred embodiment of the invention is a hardener as defined by (III) wherein the sol entirely or partly is prepared by controlled hydrolysis and condensation of tris [3-trialkoxysilylpropyl]isocyanurate.

The hardener of the invention may when convenient, also include at least one UV absorber, at least one radical scavenger, at least one antioxidant, at least one dye or a pigment, at least one filler and/or at least one additive.

According to another aspect the invention may also comprise mixtures comprising at least one of the sol-gel based hardeners according to one of the above said aspects of the invention, and epoxy resins and optionally additives such as antioxidants, light absorbing agents (UV absorbers), radical scavengers, acid controllers, dyes, pigments, fillers and/or other additives.

EXAMPLES

Preparation of Particle Forming Condensation Product 1. 250 g γ-aminopropyl triethoxysilane (γ-APS, Crompton Corporation, USA) is placed in a 1000 ml round bottom flask with condenser and magnetic stirrer. A mixture of 73.5 g butyldiglycol (BDG) and 28.5 g water is added. The mixture was heated in an oil bath to 110° C. under reflux for 45 minutes. The condenser is replaced by a distillation column and volatile reaction products are removed at an oil bath temperature of 110° C. and a vacuum gradient of from 1000 mbar-20 mbar. The distillation is terminated when the pressure in the round bottom flask has reached 20 mbar or less for 10 minutes. About 175 ml distillate was collected. The reaction product is a clear, colourless liquid with Gardner Colour<1 (according to Gardner Colour Scale/ASTM D 1544) and a viscosity<400 mPas. Titration with 4-dodecylbenzene sulphonic acid in ethanol/water (96 vol-% ethanol) showed that about 75% of the amino groups in the original γ-APS are available for protonation with 4-dodecylbenzene sulphonic acid.

2. 250 g γ-aminopropyl triethoxysilane (γ-APS, Crompton Corporation, USA) is placed in a 1000 ml round bottom flask with condenser and magnetic stirrer. A mixture of 73.5 g butylglycol (BDG) and 28.5 g of water and 0.73 g Tinuvin 123 (Ciba Specialty Chemicals, Switzerland) is added. The composition is heated in an oil bath at 110° C. under reflux for 45 minutes. The round bottom flask is replaced by a distillation column and volatile components are removed at oil bath temperature 110 C. and a vacuum gradient from about 1000 mbar-20 mbar. The distillation is terminated when the pressure in the round bottom flask has reached 20 mbar or less for 10 minutes. About 172 ml of distillate was collected. The reaction product is a clear colourless liquid with Gardner Colour=1 (according to Gardner Colour Scale/ASTM D 1544) and viscosity<400 mPas. Titration with 4-dodecylbenzene sulfonic acid in ethanol/water (96% ethanol) showed that 75% of the amino groups of the original are available for protonation with 4-dodecylbenzene sulfonic acid.

3. 250 g γ-aminopropyl triethoxysilane (γ-APS, Crompton Corporation, USA) is placed in a 1000 ml round bottom flask with condenser and magnetic stirrer. A mixture of 73.5 g butylglycol (BDG) and 28.5 g of water and 0.73 g Tinuvin 123 (Ciba Specialty Chemicals, Switzerland) is added. The composition is heated in an oil bath at 110° C. under reflux for 45 minutes. The condenser is replaced by a distillation column and volatile components are removed at oil bath temperature 110 C and a vacuum gradient from about 1000 mbar-20 mbar. The distillation is terminated when the pressure in the round bottom flask has reached 20 mbar or less for 10 minutes. About 175 ml of distillate was collected. To the still warm reaction product is added a heated solution of 1.0 g Cyasorb UV-1164 (Cytec Inc., USA) in 10 ml cyclohexane (Cytek Inc., USA). Thereafter another distillation is performed as described above until the pressure in the round bottom flask has reached 20 mbar or less for 10 minutes. The reaction product is a clear yellow liquid with Gardner Colour=3 (according to Gardner Colour Scale/ASTM D 1544) and viscosity<400 mPas at 50° C. At 10° C. the reaction product is a wax-like, crystalline yellow mass.

4. 885.6 g γ-aminopropyl triethoxysilane (γ-APS, Crompton Corporation, USA) is placed in a 1000 ml round bottom flask with condenser and magnetic stirrer. A mixture of 389.3 g butylglycol (BDG) and 93.6 g of water and 12.0 g Tinuvin 123 (Ciba Specialty Chemicals, Switzerland) is added. The composition is heated in an oil bath at 110° C. under reflux for 45 minutes. The condenser is replaced by a distillation column and volatile components are removed at oil bath temperature 110° C. and a vacuum gradient from about 1000 mbar-20 mbar. The distillation is terminated when the pressure in the round bottom flask has reached 20 mbar or less for 10 minutes. About 536 g of distillate was collected. To the still warm reaction product are added a heated solution of 12.0 g Cyasorb UV-1164 and 12.0 g Cyasorb UV-2908 (Cytec Inc., USA) dissolved in 94 ml toluene. Thereafter another distillation is performed as described above until the pressure in the round bottom flask has reached 20 mbar or less for 10 minutes. The reaction product is a clear yellow liquid with Gardner Colour=3 (according to Gardner Colour Scale/ASTM D 1544) and viscosity<400 mPas at 50° C. At 10° C. the reaction product is a wax-like, crystalline yellow mass.

5. 597.8 g γ-aminopropyl triethoxysilane (γ-APS, Crompton Corporation, USA) is placed in a 1000 ml round bottom flask with condenser and magnetic stirrer. A mixture of 262.5 g butylglycol (BDG) and 63.2 g of water and 8.1 g Tinuvin 123 (Ciba Specialty Chemicals, Switzerland) is added. The composition is heated in an oil bath at 110° C. under reflux for 45 minutes. The condenser is replaced by a distillation column and volatile components are removed at oil bath temperature 110 C and a vacuum gradient from about 1000 mbar-20 mbar. The distillation is terminated when the pressure in the round bottom flask has reached 20 mbar or less for 10 minutes. About 536 ml distillate was collected. To the still warm reaction product is added a heated solution of 12.0 g Cyasorb UV-1164 (Cytec Inc., USA) dissolved in 36 ml toluene. Thereafter another distillation is performed as described above until the pressure in the round bottom flask has reached 20 mbar or less for 10 minutes. The reaction product is a clear yellow liquid with Gardner Colour=3 (according to Gardner Colour Scale/ASTM D 1544) and viscosity<400 mPas at 50° C. At 10° C. the reaction product is a wax-like, crystalline yellow mass.

Mixture of Particle Forming Condensate Product with Commercial Hardeners and Conversion of the Mixture with Commercial Epoxy Resins for Test/Plate Preparation 6. 100 g epoxy resin (commercially available reaction product from the conversion of 2,2-bis-(4-hydroxyphenyl)-propane and epichlorohydrin, CY 219, Vantico AG, Switzerland) was weighed in a beaker with a weight of an accuracy of 0.1 g. Then 50 g hardener (1:1 v/v mixture of the sol from experiment 1 and HY 5160 from Vantico AG, Switzerland) was added and the mixture was thoroughly stirred by hand. The resin was preheated to 40° C., while the hardener was at ambient temperature, i.e. about 23° C. Thereafter the mixture was placed in a hot cabinet at 40 C to facilitate air removal from the epoxy composition, i.e. removal of small air bubbles. After some minutes the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and post-cured for about 17 h at 70° C. The samples were finally wrapped in paper and put into plastic bags provided with zippers.

7. Different compositions of hardeners were prepared between particle-forming condensation products in 3-5, and a commercially available low viscous, phenol free, modified, cycloaliphatic polyamine hardener for epoxy resins (Aradur 2965, Vantico AG, Switzerland). The different compositions are listed in table 1.

TABLE 1

| Hardener comp. No. | Particle-forming condensation product, prepared in Example No. | % by weight of particle-forming condensation product in the composition | % by weight of Aradur 2965 in the composition |
|---|---|---|---|
| I. | 3 | 100 | 0 |
| II. | 11 | 67 | 33 |
| III. | 11 | 33 | 67 |
| IV. | 12 | 50 | 50 |
| V. | — | 0 | 100 |

The such prepared hardener compositions were mixed with epoxy resins (commercially available reaction product from the conversion of 2,2-bis-(4-hydroxyphenyl)-propane and epichlorohydrin (Araldite GY 250, Vantico AG, Switzerland) in the same manner as in Example 6. The compositions were cured to about 2 mm thick layers on plates of PVDF (polyvinylene fluoride). The mixture ratios are shown in table 2.

TABLE 2

| Sample/ plate No. | Hardener composition No. | % by weight of hardener composition in the mixture | % by weight of Araldite GY 250 in the mixture |
|---|---|---|---|
| P I. | I. | 33 | 67 |
| P II. | II. | 33 | 67 |
| P III. | III. | 33 | 67 |
| P IV. | IV. | 33 | 67 |
| P V. | V. | 33 | 67 |

Conversion of Particle-Forming Condensation Product with Commercially Available Epoxy Resins for Preparation of Samples/Plates 8. 100 g epoxy resin (commercially available reaction product from the conversion of 2,2-bis-(4-hydroxyphenyl)-propane and epichlorohydrin, CY 219, Vantico AG, Switzerland) was weighed in a beaker with a weight of an accuracy of 0.1 g. Then 50 g hardener (sol prepared in Example 1) was added and the mixture was thoroughly stirred by hand. The resin was preheated to 40° C., while the hardener was at ambient temperature, i.e. about 23° C.

Thereafter the mixture was placed in a hot cabinet at 40° C. to facilitate air removal from the epoxy composition, i.e. removal of small air bubbles. After some minutes the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and post-cured for about 17 h at 70° C. Finally, the samples were wrapped in paper and put into plastic bags provided with zippers.

9. 100 g epoxy resin (commercially available reaction product from the conversion of 2,2-bis-(4-hydroxyphenyl)-propane and epichlorohydrin, CY 219, Vantico AG, Switzerland) was weighed in a beaker with a weight of an accuracy of 0.1 g. Then 50 g hardener (sol prepared in Example 2) was added and the mixture was thoroughly stirred by hand. The resin was preheated to 40° C., while the hardener was at ambient temperature, i.e. about 23° C.

Thereafter the mixture was placed in a hot cabinet at 40° C. to facilitate air removal from the epoxy composition, i.e. removal of small air bubbles. After some minutes the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and post-cured for about 17 h at 70° C. Finally, the samples were wrapped in paper and put into plastic bags provided with zippers.

10. 100 g epoxy resin (commercially available reaction product from the conversion of 2,2-bis-(4-hydroxyphenyl)-propane and epichlorohydrin, CY 219, Vantico AG, Switzerland) was weighed in a beaker with a weight of an accuracy of 0.1 g. Then 50 g hardener (sol prepared in Example 3) was added and the mixture was thoroughly stirred by hand. The resin and the hardener were preheated to 60° C. in a hot cabinet. Thereafter the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and post-cured for about 17 h at 70° C. Finally, the samples were wrapped in paper and put into plastic bags provided with zippers.

11. 100 g epoxy resin (commercially available reaction product from the conversion of 2,2-bis-(4-hydroxyphenyl)-propane, 2,2-bis-(4-hydroxyphenyl)-methane and epichlorohydrin, to which was added low viscous epoxides for dilution (L 0166/S700, Bakelite AG, Germany) was weighed in a beaker with a weight of an accuracy of 0.1 g. Then 50 g hardener (sol prepared in Example 1) was added and the mixture was thoroughly stirred by hand. The resin was preheated to 40° C., while the hardener was at ambient temperature, i.e. about 23° C. Thereafter the mixture was placed in a hot cabinet at 40 C to facilitate air removal from the epoxy composition, i.e. removal of small air bubbles. After some minutes the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and post-cured for about 17 h at 70° C. Finally, the samples were wrapped in paper and put into plastic bags provided with zippers Conversion of Commercially Available Hardeners with Commercially Available Epoxy Resins for Preparation of Samples/Plate 12. 100 g epoxy resin (commercially available reaction product from the conversion of 2,2-bis-4-hydroxyphenyl)-propane and epichlorohydrin, CY 219, Vantico AG, Switzerland) was weighed in a beaker with a weight of an accuracy of 0.1 g. Then 50 g hardener (HY 5160, Vantico AG, Switzerland) was added and the mixture was thoroughly stirred by hand. The resin was preheated to 40° C., while the hardener was at ambient temperature, i.e. about 23° C. Thereafter the mixture was placed in a hot cabinet at 40 C to facilitate air removal from the epoxy composition, i.e. removal of small air bubbles. After some minutes the mixture was transferred to a 60 ml disposable syringe and subsequently transferred to Petri dishes with internal diameter of 87 and 137 mm. The dishes had been waxed with a layer of slip wax from Vantico of the type QV 5110. Subsequent this transferral lids were placed on the Petri dishes. The samples were cured for one day (24 h) at room temperature. Thereafter the samples were demoulded and postcured for about 17 h at 70° C. Finally, the samples were wrapped in paper and put into plastic bags provided with zippers Modification of More or Less free Amino Groups at the Surface of Particle-Forming Condensation Products 13. 100 g reaction product from 11 is heated to 70° C. to obtain a clear liquid. Then 100 g glycidyl-2-methylphenylether (CAS [2210-79-9]; Araldite DY-K, Vantico AG, Switzerland) is added and the reaction mixture held at 70° C. for one hour. A clear yellow product is obtained that is viscous gel at 10° C. and a low viscous liquid at 80° C. This product reacts significantly slower in a curing process with commercially available reaction products from the conversion of 2,2-bis(4-hydroxyphenyl)-propane and epichlorohydrin than the reaction product from 11.
14. 100 g reaction product from 11 is heated to 70° C. to obtain a clear liquid. Then 150 g glycidyl-2-methylphenylether (CAS [2210-79-9]; Araldite DY-K, Vantico AG, Switzerland) is added and the reaction mixture held at 70° C. for one hour. A clear yellow product is obtained that is viscous gel at 10° C. and a low viscous liquid at 80° C. In contradiction to the reaction product from 11, this product does not react in a curing process with commercially available reaction products from the conversion of 2,2-bis(4-hydroxyphenyl)-propane and epichlorohydrin.

Characterisation and Testing:

Sol Particle Size

The particle size of the sol was measured using the light scattering principle. A commercial instrument, "Zetasizer 3" from Malvern, UK, was used for the determination of size distribution. The size distribution was sharp and the average particle size was less than 5 nm for the sols prepared according to Examples 1-3.

Abrasion Properties

Abrasion properties were tested using a Universal Wear Testing Machine from Eyre/Bicere—apparatus. The constant weight was 588 g (3× load). A relatively large number of scratches were made on a plate made in accordance with Example 9. On a plate made in accordance with Example 4 the scratches are barely visible.

Scratch Resistance/Abrasion Properties as Determined by to Erichsen Test

The scratch resistance/abrasion test was investigated by means of a hardness pen of Erichsen type (Erichsen, Germany). The method is based on making a scratch with the hardness pen. The force exerted during the test is controlled by a spring. The hardness value related to the force is read from the hardness pen in Newton [N]. At least three parallel measurements are made to each sample. It is recorded when the force does not provide visible scratches and at what force the first visible scratch is obtained. The test was conducted on a series of plates prepared as described by Example 8. It is shown that the force required to make scratches on plates made with modified hardener, is at least 40 times greater than the force required to make scratches on the plates made with commercial amine based hardeners. The results are given in table 3.

TABLE 3

| Plate/sample No. | Force [N] |
|---|---|
| P I. | >20 |
| P II. | 9-10 |
| P III. | 9-10 |
| P IV. | 8-9 |
| P V. | 0-0.2 |

Accelerated Ageing and Measurement of Colour/Brightness

The epoxy plates made in accordance with Example 14 were subjected to accelerated ageing according to ISO 4892-3 for 426 hours. The test instrument was an ATLAS UVCON weather-o-meter (Atlas Inc., USA) furnished with UVA-340 fluorescence lamps. The test cycle comprised 4 hours UV radiation at dry heating to 45° C., 30 minutes of water sprinkling at 10-12° C. and 3 hours and 30 minutes of condensation at 40° C.

The colours of the plates were measured prior to the accelerated ageing and subsequent the accelerated ageing according to ASTM 2244.

Colour measured in so-called outdoor light, D65, 10°

| Reference standard | White (33112035N) |
|---|---|
| Colour difference in CIE-lab | DL, Da, Db and DE |
| Total colour change | DE |
| Colour coordinates | DL(white/black), Da(red/green) and Db(yellow/blue) |

Typical results of the colour measurements are shown in table 4.

TABLE 4

| plate/sample No. | DL | Da | Db | DE |
|---|---|---|---|---|
| P I. (after ageing) | −8.36 | −1.74 | 29.42 | 30.53 |
| P II. (after ageing) | −8.16 | −1.86 | 33.42 | 34.45 |
| P III. (after ageing) | −9.17 | −1.26 | 44.37 | 45.32 |
| P IV. (after ageing) | −9.14 | −0.15 | 38.81 | 39.87 |
| P V. (after ageing) | −12.22 | 2.56 | 52.85 | 54.31 |
| P III. (before ageing) | −1.08 | −0.72 | 2.24 | 2.58 |
| P IV. (before ageing) | −1.23 | −0.99 | 3.01 | 3.40 |
| P V. (before ageing) | −2.38 | −0.92 | 2.97 | 3.92 |

The brightness measurements were conducted according to ISO 2813. The results are shown in table 5. Brightness was measured in one single spot. The apparatus is a Byk Gardner multi tri gloss 20°, 60° and 85°. Due to the fact that brightness reflection at 60 provides more than 100% brightness, table 5 shows values measured with an angle of incidence of 85°. Typical results of the colour measurements are shown in table 5.

TABLE 5

| Plate/ sample No. | Brightness before accelerated ageing (angle of incidence 85°) | Brightness after accelerated ageing (angle of incidence 85°) |
|---|---|---|
| P I.   | 99.1 | 96.3 |
| P II.  | 99.4 | 93.5 |
| P III. | 98.9 | 88.8 |
| P IV.  | 96.9 | 80.0 |
| P V.   | 83.0 | 25.6 |

It is evident that epoxy plates based on the hardener of the system according to the present invention (Plate/sample No. 1-IV) exhibit significantly less colour change and/or loss of brightness than do the epoxy plates not based on such a hardener (Plate/sample No. V).

The brightness reduction is caused by chemical degradation of the plates. Thus, plates that subsequent to accelerated ageing shows little or no brightness reduction have better qualifications with respect to their ability to resist degradation from chemicals such as acids or basic liquids than do plates that exhibit comparatively large brightness reduction.

The invention claimed is:

1. A hardener for curing of epoxy resins, said hardener comprising a sol produced by:
    hydrolyzing and condensing a silane compound in a mixture of solvent and water to yield a reaction product containing particle-forming condensate products having free amino surface groups, the solvent of the mixture, the water of the mixture, alcohol generated from the hydrolysis and condensation reaction, and additional water generated from the hydrolysis and condensation reaction; and
    removing the water of the mixture, the generated alcohol, and the additional generated water;
    wherein the silane compound is represented by the formula:

    $$NH_2\text{—}B\text{—}Si(\text{—}Y)_3$$

where:
    B is a spacing group chosen from saturated or unsaturated $C_1$-$C_{18}$-alkylene and substituted or non-substituted arylene; wherein said alkylene and arylene optionally feature a carbon chain segment including one or more of: oxygen, nitrogen, sulphur, phosphorus, silicon and boron; and
    Y is ethoxy or methoxy.

2. A hardener as claimed in claim 1 wherein the hardener also comprises at least one UV-absorber.

3. A hardener as claimed in claim 1 wherein the hardener also comprises at least one free radical scavenger.

4. A hardener as claimed in claim 1 wherein the hardener also comprises at least one antioxidant.

5. A hardener as claimed in claim 1 wherein the hardener also comprises at least one dye and/or pigment.

6. A hardener as claimed in claim 1 wherein the hardener also comprises at least one filler.

7. A hardener as claimed in claim 1 wherein the hardener also comprises at least one additive.

8. A hardener as claimed in claim 1, wherein free amino groups at the surface of the particle-forming condensation product in the sol have been partly converted with reactive compounds such as epoxides, acid derivatives, blocked and non-blocked isocyanates and compounds of the type R—X, where X is chosen among halogen, substituted or non-substituted alkoxyl, phenoxyl, amine, carboxylate, sulphonate, sulphinate, phosphonate and phosphinate, and R is chosen among non-substituted saturated and unsaturated $C_1$-$C_{24}$ alkyl, substituted saturated or unsaturated $C_1$-$C_{24}$ alkyl, substituted or non-substituted aryl, aliphatic or aromatic carbonyl, wherein the carbon chains of said compounds may optionally include one or more of the elements nitrogen, sulphur, silicon and boron and groups chosen among condensation products of one or more type of chemical compounds selected from the group consisting of acids, alcohols, phenols, amines, aldehydes and epoxides.

9. A hardener for curing of epoxy resins as claimed in claim 1, wherein the solvent is butyldiglycol.

10. A hardener for curing of epoxy resins as claimed in claim 1, wherein the hydrolysis and the condensation are conducted by heating the mixture of the solvent and the particle forming condensate products in an oil bath to 110° C. under reflux for 45 minutes.

11. A hardener for curing of epoxy resins as claimed in claim 1, wherein the volatile components are removed in an oil bath to 110° C. and a vacuum gradient from 1000 mbar-20 mbar.

12. A cured epoxy material, manufactured from an epoxy resin and a hardener as defined by claim 1.

13. A method for curing epoxy resins, comprising the steps of:
    (i) producing the hardener as defined in claim 1 by removing the volatile components from the reaction product; and
    (ii) mixing the hardener, subsequent to possible storage, with an epoxy resin so that the epoxy resin is cured.

* * * * *